United States Patent Office 3,846,120
Patented Nov. 5, 1974

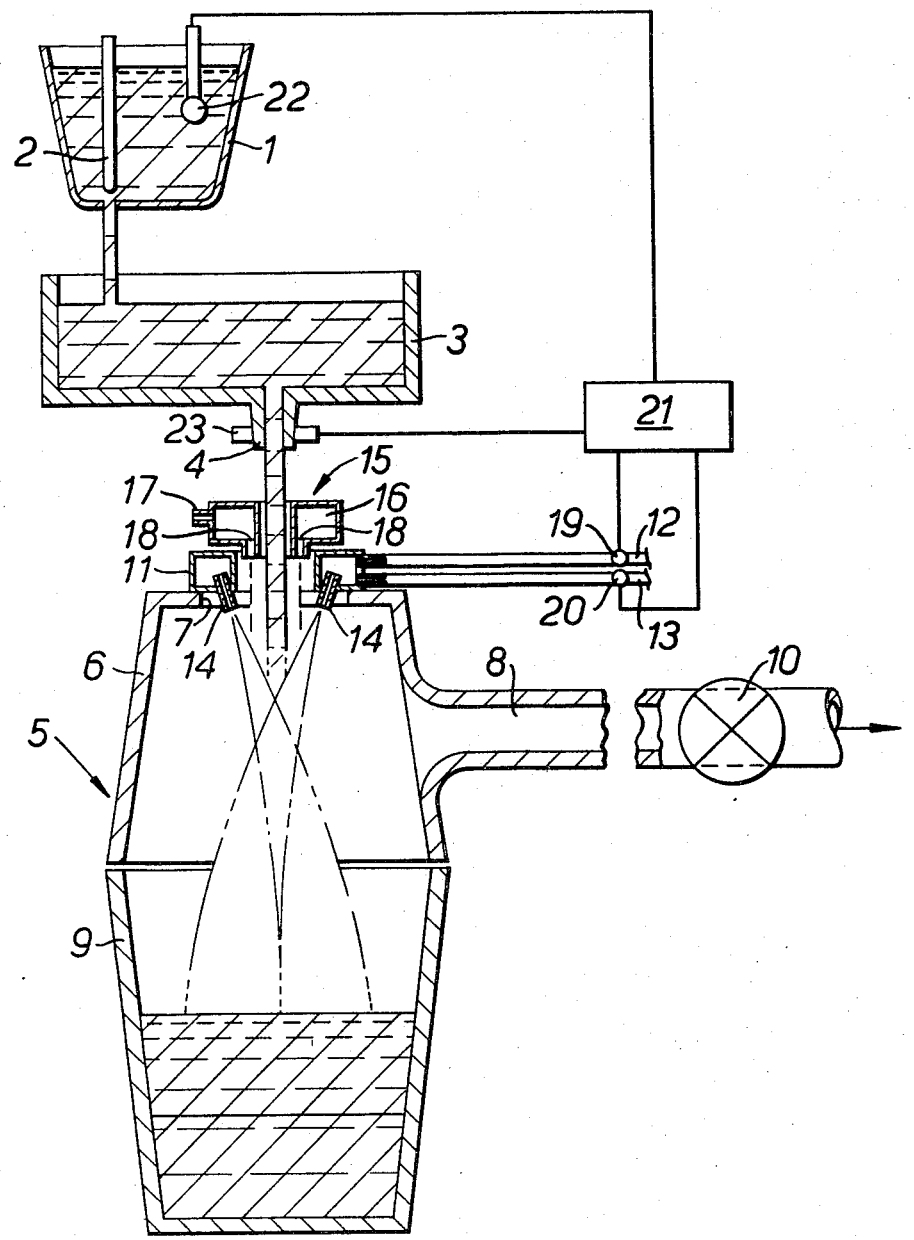

3,846,120
TREATMENT OF MOLTEN METAL
Reginald Mayorcas, Chester, and David Alec Hawkes, Guisborough, England, assignors to British Steel Corporation, and Spray Steelmaking Ltd., both of London, England
Filed Dec. 6, 1971, Ser. No. 205,254
Int. Cl. C21c 5/28
U.S. Cl. 75—59                    12 Claims

ABSTRACT OF THE DISCLOSURE

A process for the treatment of molten material comprising the steps of feeding the molten material to a reaction vessel as a freely-falling stream therein, shattering the freely-falling stream in space within the vessel by a flow of gas capable of reacting with the material, maintaining the mass flow rate of gas within pre-determined limits and controlling the reactive potential of the gas by appropriate variation of its content of an additional constituent.

---

This invention relates to the treatment of molten material with gaseous reagents and, in particular, to processes in which a stream of molten material is shattered by the action of a jet or jets of gas capable of reacting with the material. It may be applied, for example, to the treatment of molten metal with gas capable of reacting with the metal and/or with impurities therein.

In processes to which the invention relates, completion of the desired reaction requires that the appropriate mass of reactive gas should be brought into contact with the molten material and the degree of the reaction is influenced by the median size of the particles of metallic or other material produced in the shattering of the molten stream and also by the spread of particle sizes produced; these two factors are, in turn, dependent upon the energy transferred to the stream by the gas jet or jets. The energy which a gas jet will transfer to a molten stream is determined, inter alia, by the distance between the stream and the gas nozzle exit and by the mass flow of gas through the nozzle: furthermore, there is, for any given nozzle situated at a given distance from the stream, a particular range of gas mass flows through the nozzle which will result in shattering of the stream in a satisfactory manner.

In accordance with the invention in one aspect, there is provided a process for the treatment of molten material comprising the steps of feeding the molten material to a reaction vessel as a freely-falling stream therein, shattering the freely-falling stream in space within the vessel by a flow of gas capable of reacting with the material, maintaining the mass flow rate of gas within pre-determined limits and controlling the reactive potential of the gas by appropriate variation of its content of an additional constituent.

In accordance with the present invention in another aspect, there is provided apparatus for treating molten material comprising a container having an outlet from which molten material may be fed as a freely-falling stream, a reaction vessel through which the material may pass, gas discharge means to emit a flow of gas capable of reacting with the material to shatter the material stream, means operable to maintain the gas mass flow rate within pre-determined limits and means operable to control the reactive potential of the gas by appropriate variation of its content of an additional constituent.

One process to which the invention relates is the so-called spray steelmaking process, in which a stream of molten iron is shattered by the action of a jet or jets of a gas capable of oxidising metalloid impurities in the iron.

In the accompanying drawing, the sole Figure is a vertical cross-section through refining apparatus in accordance with the invention.

The refining apparatus includes a transfer ladle 1 having a flow control stopper 2 for controlling the rate of flow of molten metal to a tundish 3, which has a refractory outlet nozzle 4. Positioned beneath the tundish, is a reaction vessel 5 which comprises a hood 6, having a central aperture 7 and a waste gas offtake 8, and a receiving vessel 9 positioned beneath the hood 6. An extractor fan 10 is located in the offtake 8, which is shown as having a single inlet but can comprise a plurality of inlets arranged around the hood.

Located on the hood 6 is a gas discharge device comprising a header 11 served by a pair of inlet pipes 12 and 13 and having a plurality of convergent/divergent nozzles 14 which are orientated so as to direct jets of gas downwardly and inwardly to impact the stream of molten metal discharged by the tundish nozzle 4.

The aperture of the tundish nozzle 4 is of generally circular cross-section of outlet and the nozzles 14, each of which is also of generally circular cross-section outlet, are arranged in a ring about the molten stream. Alternatively, the tundish nozzle 4 may be of generally rectangular or elliptical cross-section outlet and the outlet nozzles 14, which may also be of generally rectangular or elliptical cross-section at outlet, may be disposed one adjacent each longitudinally extending side of the molten stream or there may be one such nozzle on one longitudinal side only of the stream.

A flux discharge device 15 is mounted above the gas discharge device and comprises an annular manifold 16 having an inlet 17 and outlets 18 to discharge a curtain of fluxing agent around the stream of molten metal. The inlet 17 is coupled to a source of gas-entrained flux.

The inlet pipe 12 is connected to a source of oxidising gas, for example, oxygen, and is provided with valve means 19, whilst inlet pipe 13, which is provided with valve means 20, is connected to a source of additional gas, such as inert gas, for example nitrogen, or compressed air or steam or carbon dioxide.

For automatic operation, the apparatus includes a computing device 21, arranged to receive signals from analysis means 22 adapted to sample the molten metal in the ladle 1 (or at some other location upstream of the refining apparatus or within the receiving vessel 9) and from a device 23 for measuring the flow rate of the metal stream leaving the tundish 3.

In operation, molten iron is withdrawn from a suitable source into the transfer ladle 1, whence it is poured at a controlled rate into the tundish 3 to maintain a substantially constant head therein. The molten metal in the tundish will fall from the nozzle 4 as a coherent stream, at a rate determined in part by the head in the tundish.

The freely-falling metal stream, together with any stream of flux discharged from the outlets 18, is shattered by and intimately mixed with jets of oxidising gas discharged at supersonic velocity from the outlet nozzles 14 of the gas discharge device. The metalloid impurities in the molten metal react with the oxidising gas and refined material is collected in the receiving vessel 9.

The degree of the reaction between the gas and the metalloid impurities and, indeed, of any undesired reaction which may occur between the gas and the metal itself depends upon the reaction potential of the gas and upon the intimacy of the mixing of the gas with the liquid material which, in turn, depends upon the size and distribution of the liquid particles produced by the shattering of the stream. These latter factors, in their turn, are determined by the manner in which the gas jets impact the stream. The flow of gases into the header 11 is controlled, first so that the amount of reactive gas reaching the molten metal is substantially that required for the required reaction with the metalloids and, secondly, so that the gas mass flow through the nozzles 14 is maintained constant or at least within a range predetermined in accordance with the design characteristics of the nozzles. Thus, the amount of reactive gas supplied to the reaction vessel 5 can be varied to meet changes in the metalloid impurity content of the metal and, at the same time, the total gas flow to the vessel 5 can be maintained constant, or within pre-determined limits, to achieve a predetermined median size and distribution of the metal particles produced in the shattering of metal streams. The control of the gas flow rate may be by manual adjustment of the valve means 19 and 20. Alternatively, the two valve means may be automatically adjusted by means of computing device 21.

When automatic control is employed, signals are fed to the computing device 21 from the analysis means 22 and from the flow-measuring device 23; the computing device 21 is adjustably pre-set, so that the mass ratio of the gases passing through the pipes 12 and 13 respectively is such that the oxidising potential of the gaseous mixture reaching the metal stream is appropriate for the desired degree of oxidation of carbon and other metalloids. Upon an increase in metalloid content being signalled by the analysis means 22, the degrees of opening of valve means 19 and 20 are appropriately increased and decreased respectively and vice versa when a fall in metalloid content is signalled. Since it may not always be possible to maintain exactly a constant rate of flow of metal from the tundish, the device 23 is employed to send signals to the computing device 21 for the purpose of imposing upon the selective control of the valve means a common control in accordance with changes in metal flow rate, the degree of opening of both valves being increased when a rise in metal flow rate is signalled and reduced when the metal flow rate falls; in extreme situations in which the pre-setting of the device 21 or the signal which is received from analysis means 22 calls for maximum oxidising potential, the control effected by the device 23 will be of the degree of opening of valve means 19 only, valve means 20 remaining closed.

In order that the invention may be more fully understood, the following Examples based on experiments carried out are given by way of illustration only.

EXAMPLE 1

For refining molten unrefined iron containing 3.88 C, 1.28 Si, 0.81 Mn, 0.22 P, 0.007 S, balance Fe, a freely-falling stream of the molten iron was introduced to the reaction vessel at a flow rate of 7.68 tonne/hr. Oxygen and nitrogen were introduced to the reaction vessel through the nozzles 14 as a mixture containing 70% $O_2$ and 30% $N_2$ and at a total gaseous flow rate of 817 m.$^3$/hr. to produce a steel containing 0.03 C, 0.02 Si, 0.06 Mn, 0.03 P, 0.0165 S, balance Fe.

Upon an increase in the metalloid impurity content of the molten iron being detected by the analysis means 22, the computing device 21 operates to adjust the settings of the valve means 19, 20 to increase the proportion of oxygen entering the reaction vessel through the nozzles 14 whilst maintaining the total gaseous flow rate substantially constant. Thus, the increase in metalloid impurity content of the molten iron is countered by a corresponding increase in oxygen supply whilst the atomising power of the gaseous flow issuing from nozzles 14 is maintained substantially constant.

EXAMPLE 2

For refining molten unrefined iron containing 3.81 C, 1.44 Si, 0.95 Mn, 0.08 P, 0.01 S, balance Fe, the molten iron was introduced to the reaction vessel as a freely-falling stream having a flow rate of 8.35 tonne/hr. Oxygen and nitrogen were introduced to the reaction vessel at a flow rate of 952 m.$^3$/hr. in the ratio of 60% $O_2$ to 40% $N_2$ to produce a steel containing 0.14 C, 0.02 Si, 0.12 Mn, 0.03 P, 0.03 S, balance Fe.

Upon a decrease in the metalloid impurity content of the molten iron being detected by analysis means 22, the computing device 21 operates to adjust the settings of valves 19, 20 to decrease the proportion of oxygen entering the reaction chamber whilst maintaining the total gaseous flow rate substantially constant. The change in oxygen flow is such as to counter the measured decrease in metalloid content of the molten iron whilst the change in nitrogen flow is such as to maintain the total gaseous flow and, consequently, the atomising power of the gaseous flow substantially constant.

If desired, arrangements may be employed intermediate the manual and fully automatic methods of control described above. Thus, the selective control of the degrees of opening of the valve means 12 and 13 may be effected manually, automatic control being retained in accordance with metal flow rate; alternatively, the selective control may be automatic and the common control manual.

We claim:

1. In a process for treating molten metallic material comprising the steps of:
   (a) feeding untreated molten material at a predetermined flow rate to a reaction vessel as a freely-falling stream therein,
   (b) determining the rate at which constituents to be removed from the molten material enter the reaction vessel as impurity contained in the untreated material,
   (c) directing towards the freely-falling stream a gaseous flow which comprises an aggregation of a gas capable of reacting chemically with said impurity content of the untreated material in a quantity sufficient to remove said impurity content from said untreated material and an additional gas which is less chemically-reactive than the first-mentioned gas, at an aggregate flow rate which produces an energy transfer to the freely-falling stream sufficient to shatter said stream into a spray of particles having a predetermined particle size, and
   (d) causing the reactive gas to mix intimately with said particles and to react chemically with said impurity content of said material to remove said impurity from said material,
   the improvement which comprises the step of
   (e) controlling the reactive potential of said gaseous flow by varying the proportion of reactive gas contained therein in accordance with said impurity content of the untreated molten material, while maintaining the aggregate gas flow at a rate which shatters the stream into particles having said predetermined median particle size.

2. A process according to claim 1 wherein the control of the reactive potential of the gas is effected in accordance with changes in the composition of the molten material.

3. A process according to claim 1 wherein the control of the reactive potential of the gas is effected in accordance with changes in the degree of the reaction desired.

4. A process according to claim 1 wherein the mass flow rate of gas is maintained substantially constant.

5. A process according to claim 1 wherein the mass flow rate of gas is varied within pre-determined limits in accordance with changes in the rate of flow of molten material to the reaction vessel.

6. A process according to claim 1 further comprising the step of introducing a fluxing agent to the reaction vessel.

7. A process according to claim 6 wherein the fluxing agent is introduced in the form of a curtain around the freely-falling molten stream.

8. A process according to claim 1 wherein the material to be treated is molten iron and wherein the gas capable of reacting with the material is an oxidising gas.

9. A process according to claim 8 wherein the additional constituent comprises compressed air.

10. A process according to claim 8 wherein the additional constituent comprises nitrogen.

11. A process according to claim 8 wherein the additional constituent is carbon dioxide.

12. A process according to claim 8 wherein the additional constituent is steam.

References Cited

UNITED STATES PATENTS

| | | | |
|---|---|---|---|
| 3,672,870 | 6/1972 | Rhydderch | 75—60 |
| 3,663,205 | 5/1972 | Whetton | 75—60 |
| 3,663,206 | 5/1972 | Lubanska | 75—60 |
| 2,997,384 | 8/1961 | Feichtinger | 75—59 |
| 2,997,386 | 8/1961 | Feichtinger | 75—59 |

L. DEWAYNE RUTLEDGE, Primary Examiner

P. D. ROSENBERG, Assistant Examiner

U.S. Cl. X.R.

75—60

UNITED STATES PATENT OFFICE
CERTIFICATE OF CORRECTION

Patent No. 3,846,120     Dated November 5, 1974

Inventor(s) REGINALD MAYORCAS and DAVID ALEC HAWKES

It is certified that error appears in the above-identified patent and that said Letters Patent are hereby corrected as shown below:

[30]  Foreign Application Priority Data

December 8, 1970   Great Britain . . . 58143/70

Signed and sealed this 22nd day of April 1975.

(SEAL)
Attest:

RUTH C. MASON
Attesting Officer

C. MARSHALL DANN
Commissioner of Patents
and Trademarks